US011815419B2

(12) United States Patent
Nansteel et al.

(10) Patent No.: US 11,815,419 B2
(45) Date of Patent: Nov. 14, 2023

(54) BALLISTIC PENDULUM STABILIZER

(71) Applicant: The Government of the United States of America, as represented by the Secretary of Homeland Security, Washington, DC (US)

(72) Inventors: Mark Nansteel, Egg Harbor Township, NJ (US); Xianzhi Yang, Cherry Hill, NJ (US); Roger Veldman, Dorr, MI (US); Chih-Tsai Chen, Moorestown, NJ (US); Matthew Ghent, Bel Air, MD (US)

(*) Notice: Subject to any disclaimer, the term of this patent is extended or adjusted under 35 U.S.C. 154(b) by 0 days.

(21) Appl. No.: 17/960,190

(22) Filed: Oct. 5, 2022

(65) Prior Publication Data

US 2023/0106124 A1 Apr. 6, 2023

Related U.S. Application Data

(60) Provisional application No. 63/252,843, filed on Oct. 6, 2021.

(51) Int. Cl.
*G01L 5/14* (2006.01)

(52) U.S. Cl.
CPC ................................ *G01L 5/14* (2013.01)

(58) Field of Classification Search
CPC .................................... G01L 5/00; G01L 5/14
See application file for complete search history.

(56) References Cited

U.S. PATENT DOCUMENTS 3,359,792 A * 12/1967 Lukens ................. F42C 21/00
  73/167
5,046,352 A * 9/1991 Kingery et al. .......... G01L 5/14
  73/12.06

FOREIGN PATENT DOCUMENTS

| DE | 19854093 C1 * | 8/2000 | ................. G01L 19/00 |
| DE | 4444647 B4 * | 1/2006 | ................. B82Y 15/00 |
| RU | 2712839 C1 * | 1/2020 | ................. F42B 35/00 |

* cited by examiner

*Primary Examiner* — Nguyen Q. Ha
(74) *Attorney, Agent, or Firm* — Lavanya Ratnam; Robert W. Busby; Kelly G. Hyndman

(57) ABSTRACT

Examples are directed towards apparatuses, systems, and methods. For example, an apparatus includes a weight including a first side and a second side. The first side of the weight forms a receiving hole in the first side. A pin includes a first end and a second end. The second end of the pin is inserted into the receiving hole of the weight. The pin includes a reduced portion. A pin detonator is coupled to the reduced portion of the pin to sever the pin when detonated.

20 Claims, 7 Drawing Sheets

BALLISTIC PENDULUM STABILIZER

CROSS-REFERENCE TO RELATED APPLICATIONS

This application claims the benefit of U.S. Provisional Application No. 63/252,843 entitled "Ballistic Pendulum Stabilizer," filed on Oct. 6, 2021, incorporated herein by reference in its entirety.

STATEMENT OF GOVERNMENT INTEREST

The claimed subject matter made by one or more employees of the United States Department of Homeland Security in the performance of official duties. The Government has certain rights in the invention.

FIELD

The present subject matter relates generally to the field of explosives testing, and more specifically to the field of ballistic pendulums.

BACKGROUND

Outdoor testing is subject to weather conditions. In windy conditions, wind forces may move a pendulum away from its equilibrium position at the time of detonation, varying the standoff distance between a test charge and the face of a target plate of the pendulum. Such variation also can affect the initial conditions used to compute the explosive performance corresponding to the measured pendulum response. Accurate test results depend on a reliable standoff distance, lack of pendulum bob displacement or motion at the time of detonation, and other factors. It is therefore difficult to obtain accurate test results using a ballistic pendulum, due to the influence of weather, seismic events, and the like.

SUMMARY

Embodiments of an apparatus include a weight including a first side and a second side. The first side of the weight forms a receiving hole in the first side. A pin includes a first end and a second end. The second end of the pin is inserted into the receiving hole of the weight. The pin includes a reduced portion. A pin detonator is coupled to the reduced portion of the pin to sever the pin when detonated.

In an embodiment, a system includes a weight including a first side forming a receiving hole, and a second side forming a mount hole connected to the receiving hole via a through hole. The system includes a pin including a first end and a second end. The second end of the pin is inserted into the receiving hole of the weight. The pin includes a reduced portion. A pin detonator is coupled to the reduced portion of the pin to sever the pin when detonated. A base includes a stud to engage the mount hole of the weight to mount the weight on the base.

In another embodiment, an apparatus includes a weight including a first side and a second side. The first side of the weight is configured to form a receiving hole in the first side. The second side of the weight is configured to form a mount hole interconnected to the receiving hole via a through hole. A mechanism is mounted to the receiving hole and supports a retractable pin. The mechanism is configured to controllably retract and extend the retractable pin.

In yet another embodiment, a method for stabilizing a pendulum includes positioning a base of a stabilizer under a counterweight plate of a pendulum. The method inserts a pin into a receiving hole of a weight of the stabilizer. The method places a collar around the pin onto a first surface of the weight. The method adjusts the base of the stabilizer to cause the pin to engage with the counterweight plate of the pendulum to prevent displacement of the pendulum.

Other features and aspects will become apparent from the following detailed description, which taken in conjunction with the accompanying drawings illustrate, by way of example, the features in accordance with embodiments of the claimed subject matter. This summary is not intended to identify key or essential features of the claimed subject matter, nor is it intended to limit the scope of the claimed subject matter, which is defined solely by the claims attached hereto.

BRIEF DESCRIPTION OF THE DRAWINGS

One or more example embodiments of the subject matter are described in detail with reference to the following drawings. These drawings are provided to facilitate understanding of the present subject matter and should not be read as limiting the breadth, scope, or applicability thereof. For purposes of clarity and ease of illustration, these drawings are not necessarily made to scale.

These drawings are not intended to be exhaustive or to limit the subject matter to the precise form(s) disclosed. It should be understood that the present subject matter can be practiced with modification and alteration, and that the subject matter is limited only by the claims and the equivalents thereof.

DETAILED DESCRIPTION

Figure 5:
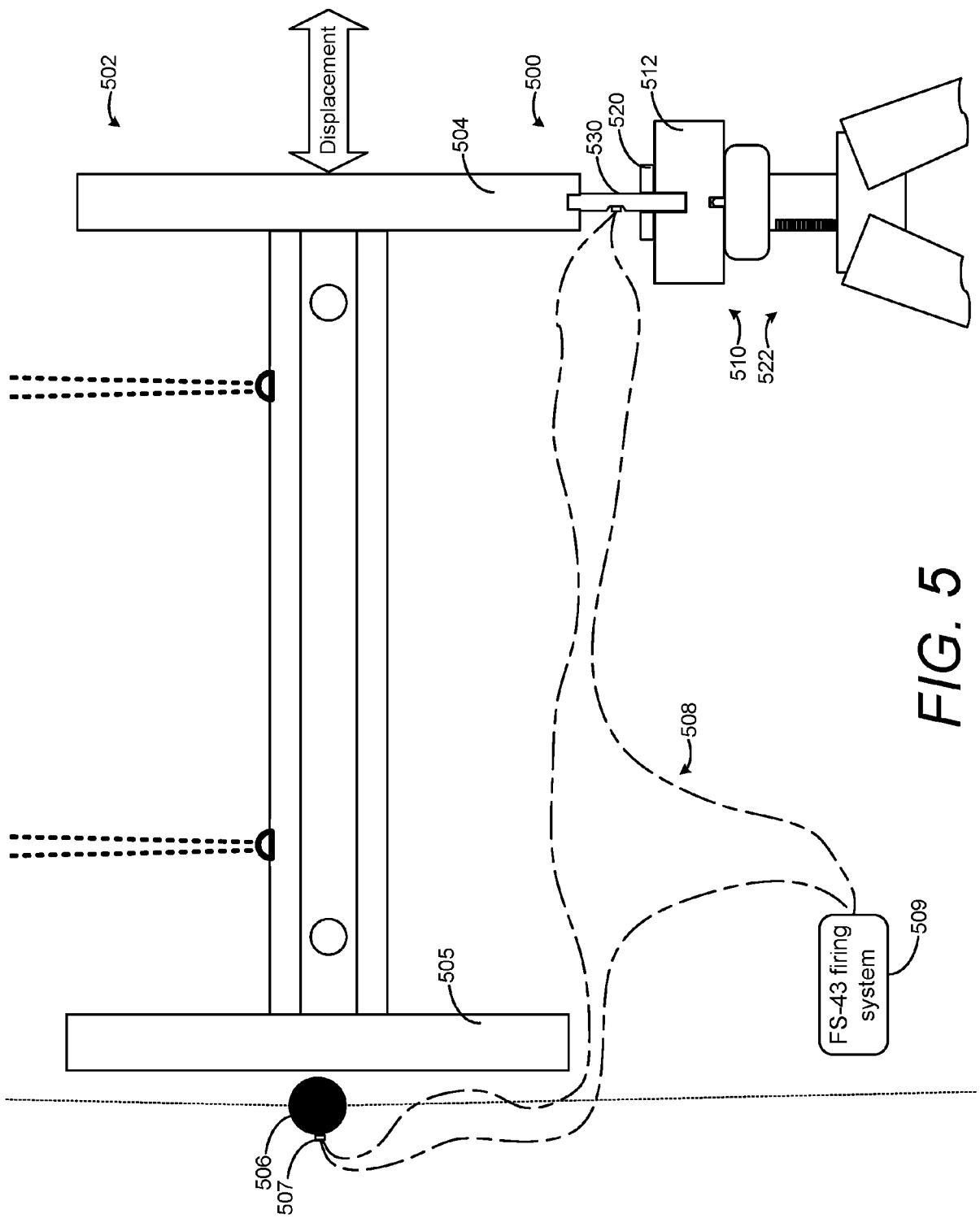
FIG. 5 illustrates a cross-section view of a system including a stabilizer and base supporting and stabilizing a pendulum in an equilibrium position according to an embodiment.

Explosives testing can be conducted with the use of a ballistic pendulum, an example of which is illustrated in FIG. 5. The ballistic pendulum 502 includes a suspended pendulum bob assembly and support frame. The bob assembly encompasses the body of the bob, and the target plate 505 and counterweight plate 504 which are connected to the ends of the body. A test charge 506 is placed at a particular standoff distance from the face of the target plate 505 while the pendulum assembly is motionless at the equilibrium position. The test charge 506 detonates and influences the pendulum 502. The influence on the pendulum 502 is measured and correlates to the performance of the test charge 506. If the pendulum 502 is affected by other factors such as wind, the explosives testing can be rendered inaccurate. A ballistic pendulum stabilizing system 500 includes a stabilizer 510 and a base 522. The stabilizer 510 ensures accurate explosive charge test results, by stabilizing the ballistic pendulum 502 and isolating the pendulum 502 from weather and other effects. An example stabilizer is shown in greater detail in FIG. 1.

Figure 1:
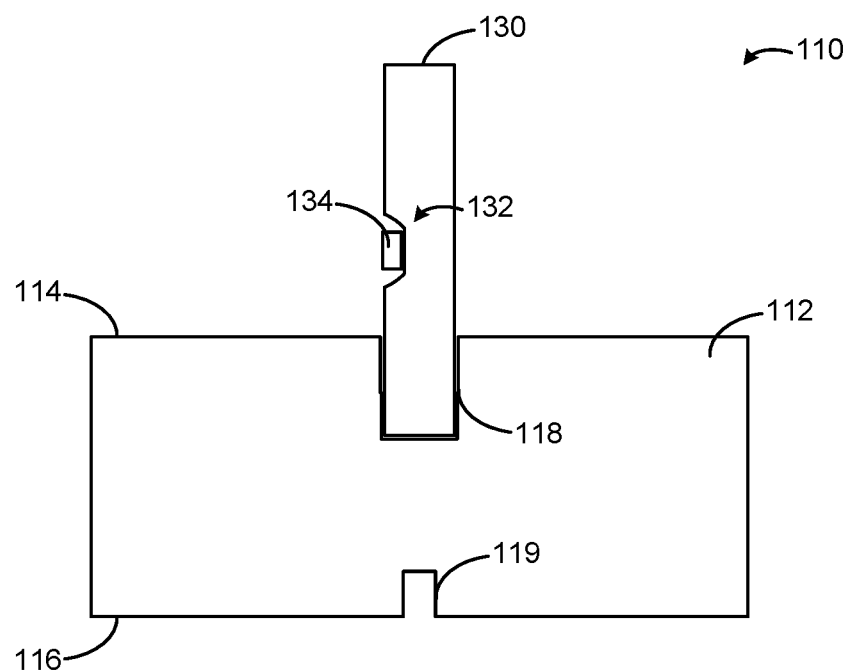
FIG. 1 illustrates a cross-section view of a stabilizer according to an embodiment.

FIG. 1 illustrates a cross-section view of a stabilizer 110 according to an embodiment. The stabilizer 110 includes a weight 112 including a first side 114 and a second side 116. The first side 114 is shaped to form a receiving hole 118. The second side 116 is shaped to form mount hole 119. The weight 112 supports pin 130 inserted into the receiving hole 118. The pin 130 includes a reduced portion 132. A pin detonator 134 is mounted at the reduced portion 132 of the pin 130.

The stabilizer 110 prevents movement of a ballistic pendulum (also referred to as pendulum, or bob), prior to its test charge being detonated. Embodiments can vary the relative timing between firing of the test detonator of the test charge, and firing of the pin detonator 134 of the pin 130. Accordingly, the stabilizer 110 allows for free movement of the pendulum without interference from the pin 130, whether shortly before, during, or after detonation of the test charge. In an embodiment, the stabilizer 110 is supported by a base (see base 222 of FIG. 2). The base 222 can be a tripod, stand, or other structure that stands on the ground and positions the pin 130 to stabilize the pendulum. The pin 130 can be a wooden dowel or other frangible material. A lower end of the pin 130 is set into and supported by the weight 112 of the stabilizer 110. An upper end of the pin 130 engages a counterweight plate of the ballistic pendulum bob (see counterweight plate 504 of FIG. 5). The engagement by the pin 130 prevents horizontal displacement of the pendulum away from its equilibrium position prior to detonation of the main explosive test charge 506 shown in FIG. 5. The pin 130 can exert a minor upward force on the counterweight plate of the pendulum bob, to secure the pin 130 in the counterweight. In an embodiment, the upward force is minor, and has no appreciable influence on the vertical position of the massive pendulum bob.

In an embodiment, the stabilizer 110 includes a pin detonator 134 coupled to the pin 130. The pin 130 and pin detonator 134 are designed so that the pin detonator 134 severs the pin 130 in a controllable manner, to cause the pin 130 to release the pendulum when the pin detonator 134 is activated. The pin detonator 134 can be coupled to the pin 130 by tape, adhesive, by inserting the pin detonator 134 into a cavity, hole, or catch formed in the pin 130, or the like. The pin detonator 134 for the pin 130 can be wired in series with a test detonator for the test charge that is to be evaluated. The timing between firing of the pin detonator 134 and the test detonator can be adjusted as needed to provide no delay, or a controlled delay between activation of the pin detonator 134 and activation of the test detonator. For example, in the case of a small, slow-acting main test charge, detonating at a large standoff from the target plate, it may be useful to delay activation of the pin detonator 134 a few tens of microseconds so that the pendulum bob release is nearly simultaneous with the blast shock from the main test charge reaching the target plate.

The pin 130 is structured and arranged so that the pin detonator 134 severs the pin 130. In an embodiment, the pin 130 is a wooden dowel, with one or more portions shaved to create a reduced portion 132 such as a notch, hole, or a narrower diameter section of the pin 130. The reduced portion 132 corresponds to where the pin detonator 134 is coupled to the pin 130, to ensure that the pin 130 is weak enough to be severed by the pin detonator 134. The location can be at a portion of the pin 130 far enough away from the pendulum so that detonation of the pin detonator 134 does not influence the pendulum. The reduced portion 132 may occupy a portion(s) of the pin 130 while leaving untouched other portions of the pin 130. For example, at a desired location along the pin's length, the reduced portion 132 can occupy approximately 40% of the circumference of the pin 130, leaving 60% of the circumference of the pin 130 at the original diameter (e.g., un-reduced). In another embodiment, the reduced portion 132 may be formed by a drill hole that passes partially or fully through the pin 130. In some embodiments, the pin detonator 134 may not be in direct contact with the shaved or reduced portion 132 of the pin 130, and may be adjacent to the shaved or reduced portion 132. In some embodiments, a pin 130 with ⅝ inch basic diameter may be reduced in diameter by up to 50%, depending on the pin material. The diameter reduction is selected so as not to allow pendulum bob displacement to occur via pin bending deformation prior to detonation, while still allowing for rapid and complete severing of the pin 130 when the pin detonator 134 is fired or activated.

In an embodiment, the pin detonator 134 detonates at approximately the same time as the test charge detonator. The pin detonator 134 severs the pin 130, freeing the pendulum, and the test charge detonator causes the test charge to detonate and begin moving the freed pendulum. Prior to detonation, the pin 130 prevented pendulum displacement or movement and held the pendulum at the equilibrium position. Accordingly, the test results are accurate, due to isolating the pendulum from movement (e.g., caused by environmental influences), so that the test generates results based on the effects of the test charge on the pendulum.

The size, strength, material, and dimensions/geometry of the pin 130 are predetermined to be strong enough to hold the pendulum at the equilibrium position, and weak enough to be destroyed by the pin detonator 134. Wooden dowels having diameters in the range of 9/16 to 11/16 inches are suitable, and the weakness of the pin 130 is adjusted by creating a reduced portion(s) 132 of the pin 130 at a location(s) and to an extent to enable the pin detonator 134 to sever the pin 130.

The pin detonator 134 is controlled, e.g., coupled to electrical wire for controlling detonation. For safety, the pin detonator 134 can require a very high voltage or current before activating. In an embodiment, the pin detonator 134 is based on Exploding Bridgewire (EBW) or Exploding Foil (EFI) concepts, that are safe and not initiated easily by stray sparks or the like. The electrical wires are connected to instrumentation (e.g., firing system 509 of FIG. 5) that provides the high voltage or current to the pin detonator 134.

Figure 2:
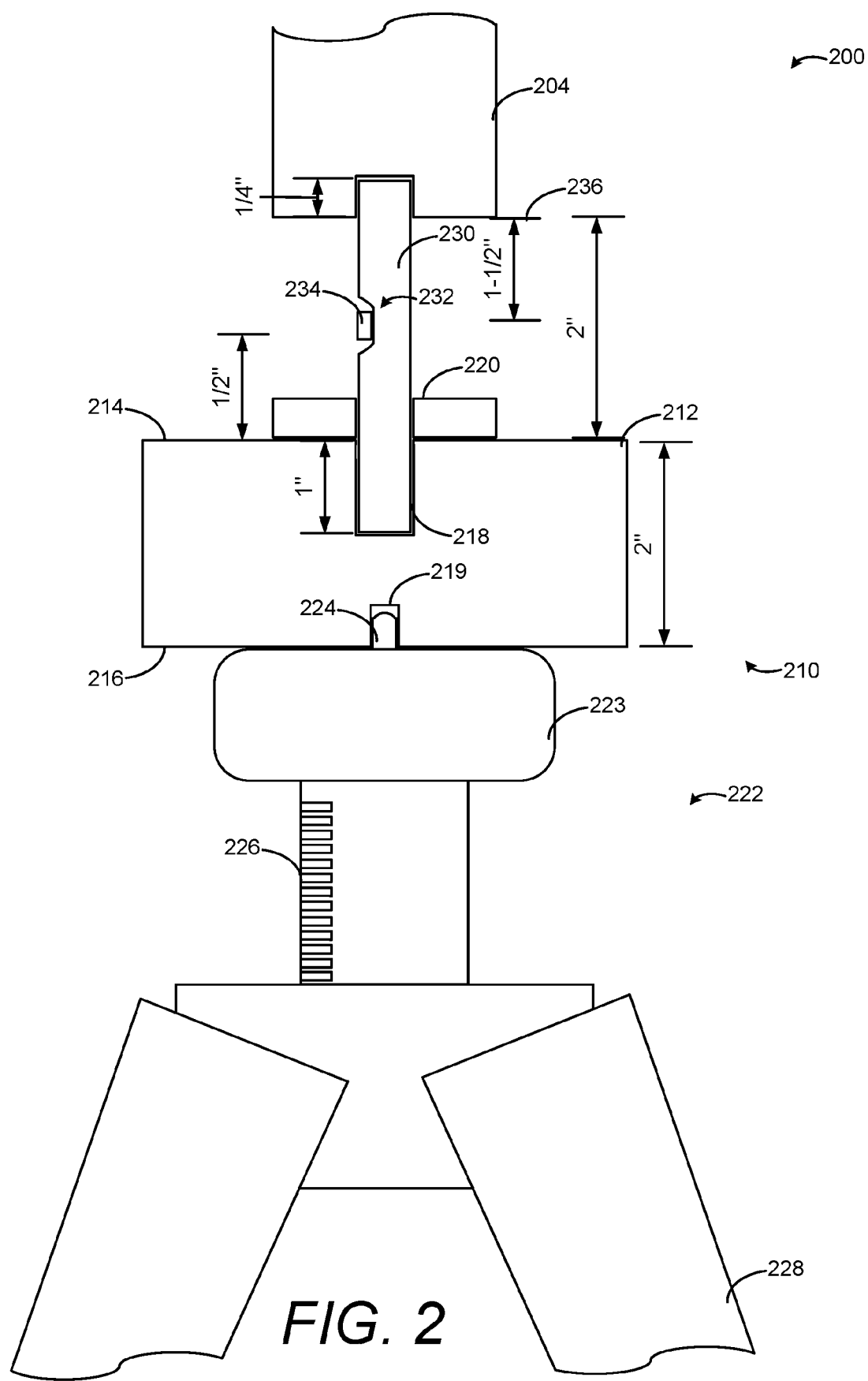
FIG. 2 illustrates a system including a cross-section view of a stabilizer including a support and stabilizing a counterweight plate of a pendulum according to an embodiment.

FIG. 2 illustrates a system 200 including a cross-section view of a stabilizer 210 including a support or base 222 and stabilizing a counterweight plate 204 of a pendulum according to an embodiment. The stabilizer 210 includes a weight 212 including a first side 214 and a second side 216. The first side 214 is shaped to form a receiving hole 218. The second side 216 is shaped to form mount hole 219. The mount hole 219 (or the receiving hole 218) can be threaded to securely engage with the stud 224 or pin 230. In other embodiments, the weight 212 can be formed to include a through-hole that passes through the weight 212 to interconnect the receiving hole 218 and the mount hole 219. The through-hole facilitates cleaning of the weight 212, e.g., for easy removal of fragments of the pin (e.g., by allowing a push rod to push out the remaining portions of the pin 230 from an underside of the weight 212). The weight 212 supports pin 230 inserted into the receiving hole 218. The pin 230 includes a reduced portion 232. A pin detonator 234 is mounted at the reduced portion 232 of the pin 230. An upper end of the pin 230 fits into an underside of the counterweight plate 204. A collar 220 is disposed on the weight 212 around the pin 230. The weight 212 is mounted to a stud 224 of the base 222 via mount hole 219 formed by the weight 212. The base 222 is illustrated as a tripod including a stud 224, pedestal 223, adjustable column 226, and legs 228. The base 222 is adjustable (e.g., via the adjustable column 226) to vary the height of the weight 212 relative to the counterweight plate 204 of the pendulum. The system 200 also can accommodate variations in height based on using different lengths of the pin 230.

Various dimensions are illustrated in the embodiment shown in FIG. 2. For example, the illustrated embodiment includes a vertical dimension of the weight shown as two inches. A depth of the receiving hole 218 is shown as one inch. A distance from an upper surface of the weight 212 to the reduced portion 232 of the pin 230 is shown as a half inch. A distance from the upper surface of the weight 212 to a lower surface of the counterweight plate 204 is shown as two inches. The upper end of the pin 230 extends into the counterweight plate 204 by a quarter inch. A spacing 236 between the lower surface of the counterweight plate 204 of the pendulum and the pin detonator 234 is shown as one and one half inches.

The pin 230 is sized to interface with the pendulum, e.g., via a pendulum receiving hole in the counterweight plate 204 of the pendulum. In an embodiment, the pin 230 is sized to fit a hole drilled into an underside of the counterweight plate 204 at the far end of the pendulum opposite the target plate of the pendulum. The pin 230 also fits into the receiving hole 218 of the weight 212 of the stabilizer 210. In an embodiment, the pin 230 and the receiving hole 218 are sized to enable a loose interference fit between the pin 230 and the weight 212. The receiving hole 218 of the weight 212 can be formed in the first side 214 of the weight 212 fitted to a top of the base 222 (e.g., a tripod). The large weight 212 can be in the shape of a circular steel plate having a diameter of approximately 3-½ to 4-½ inches, a thickness of approximately 2 to 2-½ inches, and a weight between approximately 5 and 10 pounds. The stabilizer 210 also can include a protective collar 220 fitted on top of the large weight 212, to protect the weight 212. The protective collar 220 can include a receiving hole to accommodate the pin 230, and may be formed as a small circular or ring-shaped block. In use, the stabilizer 210 is aligned to position the receiving hole 218 to enable the pin 230 to hold the pendulum (via counterweight plate 204) in an equilibrium position. The base 222 is adjusted to locate the receiving hole 218 at the height and position appropriate for holding the pendulum via the pin 230. In an embodiment, the appropriate height and position are determined to avoid disturbing an equilibrium state of the pendulum. The pin 230 is configured to include a spacing 236, from the pin detonator 234 to the counterweight plate 204. The spacing ensures that, when in use, the pin detonator 234 is at sufficient distance from the pendulum to avoid damage or to avoid moving or disturbing the pendulum. In the illustrated embodiment, the spacing 236 is 1-½ inches, based on a first end of the pin 230 extending a total of 1-¾ inches to accommodate the spacing and also an additional extension of a ¼ inch into a receiving hole of the counterweight plate 204.

The protective collar 220 fits on top of the weight 212. In an embodiment, the protective collar 220 is a metal washer that surrounds the pin 230 and sits on top of the large weight 212. The protective collar 220 protects the large weight 212 from effects of the pin detonator 234. The protective collar 220 can be consumable or replaceable. The protective collar 220 is configured to absorb the directional forces from the small amount of explosive used in the pin detonator 234. In an embodiment having a washer form, the protective collar 220 could have inner diameter just large enough to accept the pin 230, and an outer diameter between approximately 1-¾ and 2 inches, and ⅜ to ½ inch thickness. Between uses, the protective collar 220 can be rotated to position an undamaged portion near the pin detonator 234. After absorbing sufficient damage from multiple uses, e.g., when the protective collar 220 is deformed or thinned in a manner that diminishes its protective capabilities, the damaged protective collar 220 is replaced. The base 222 can include a tripod or other support structure. In an embodiment, the base includes a sturdy camera tripod capable of easily holding weights exceeding 25 pounds.

Figure 3:
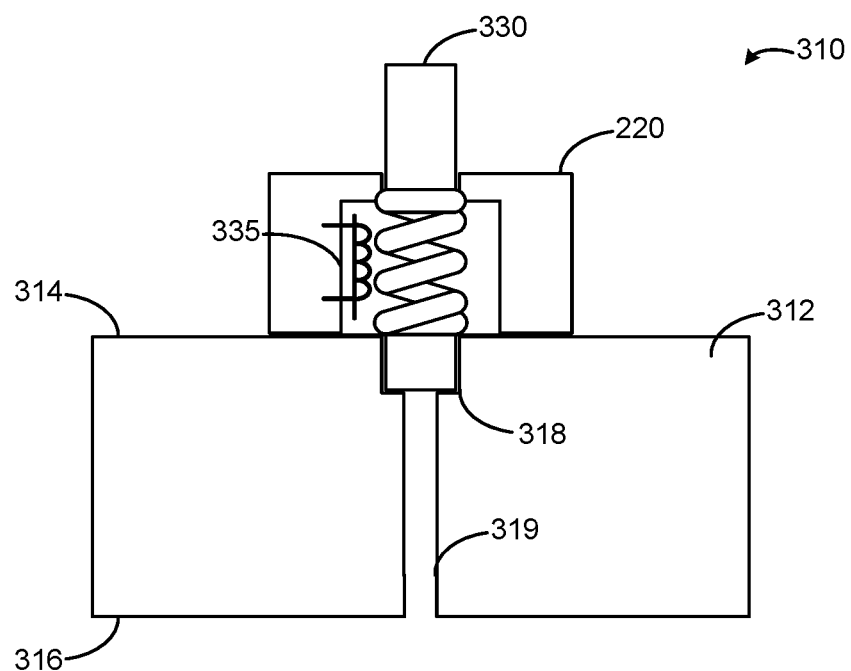
FIG. 3 illustrates a cross-section view of a stabilizer including a mechanism according to an embodiment.

FIG. 3 illustrates a cross-section view of a stabilizer 310 including a mechanism 335 according to an embodiment. The stabilizer 310 includes a weight 312 including a first side 314 and a second side 316. The first side 314 is shaped to form a receiving hole 318. The second side 316 is shaped to form mount hole 319. In the illustrated embodiment of FIG. 3, the weight 312 includes a through-hole passing through the weight 312 that connects the receiving hole 318 and the mount hole 319. The weight 312 supports mechanism 335 coupled to the receiving hole 318. A protective collar 220 protects the mechanism 335. A retractable pin 330 extends from the mechanism 335. The mechanism 335 of the illustrated embodiment is an electronic spring-loaded solenoid that can be coupled to a power source, controller, or the like to controllably retract or extend the retractable pin 330. In an embodiment, the mechanism 335 includes electronics to control the solenoid in response to a firing signal from a firing system. In another embodiment, the mechanism 335 includes a power system and communications system to receive a wireless trigger signal for the solenoid to controllably retract the pin 330. The pin 330 can be a frangible material such as wood, and can also be a non-frangible re-usable material such as metal, plastic, or the like compatible with the retracting mechanism 335. Embodiments can include solenoids that are not spring loaded, such as linear push-pull solenoids. Embodiments can include different types of solenoids, such as a linear push solenoid to extend the pin and including a return spring to retract the pin, or a linear pull solenoid to retract the pin and including a return spring to extend the pin.

In another embodiment, the mechanism can be a latch or a mechanically-actuated retractable pin (e.g., coupled to an electronic solenoid). The mechanism 335 is configured to extend the pin 330 to hold the pendulum, and in response to a trigger signal, the mechanism 335 causes the pin 330 to move away from or otherwise disengage to release the pendulum. In an embodiment, the trigger signal to the mechanism is sent in advance of the detonation signal sent to the test charge. A delay period between the trigger signal and the detonation or firing signal allows the mechanism 335 to activate and clear the pin 330 from the pendulum sufficiently before activation of the test charge. This enables the mechanism 335 (whose activation is typically slower than a detonator) to avoid interfering with the pendulum, while allowing the mechanism 335 to maintain the pendulum in the equilibrium position for as long as reasonably possible. In an embodiment, the delay period is on the order of 50 milliseconds, consistent with an activation time of an example mechanism having a solenoid-based actuator. In an embodiment, the delay period is zero and the mechanism 335 is activated simultaneously with the test charge detonator. The mechanism 335 is controlled, e.g., coupled to electrical wire for controlling operation of the mechanism 335 (e.g., coupled to an electrical source that actuates the solenoid).

Figure 4:
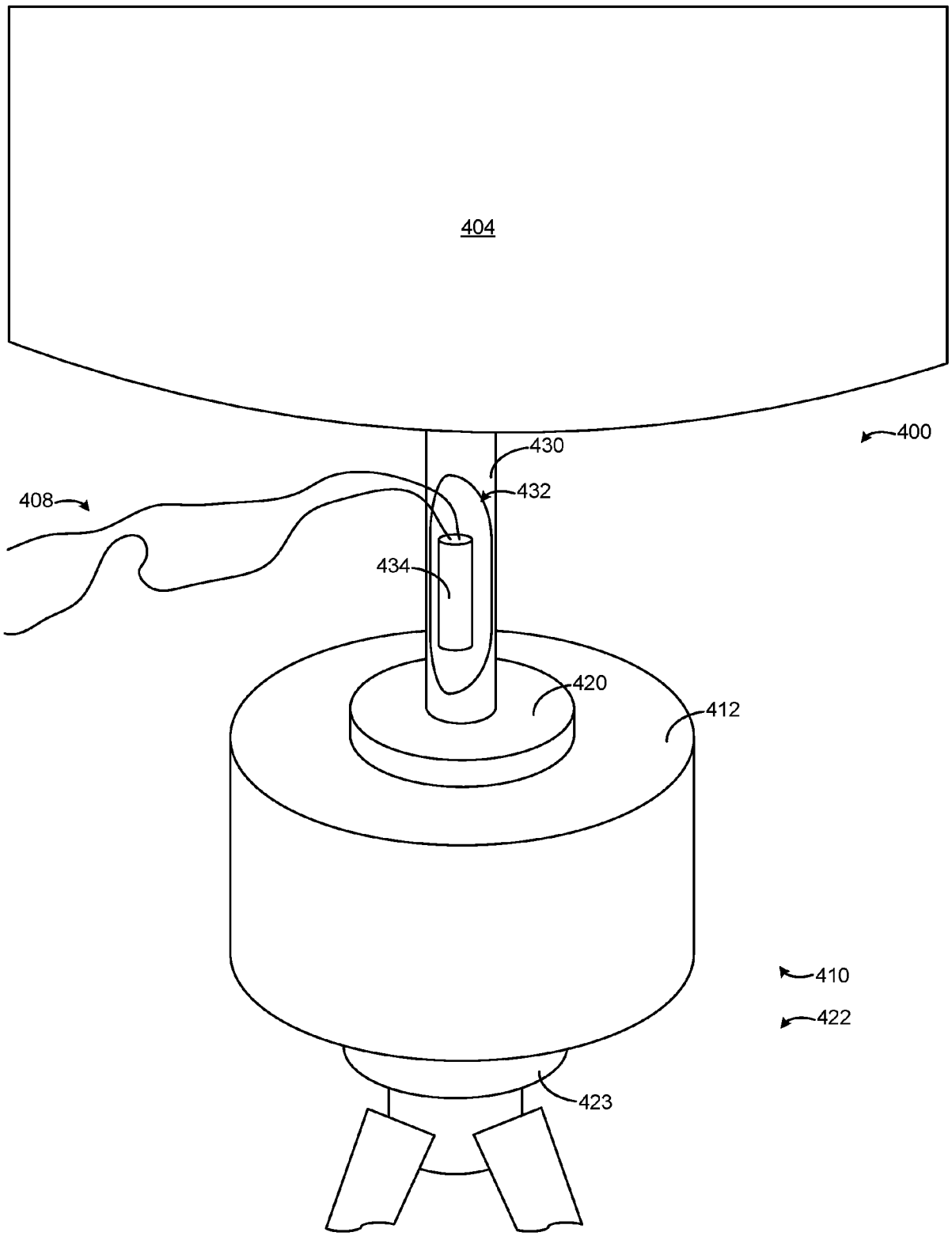
FIG. 4 illustrates a perspective view of a system including a stabilizer including wiring and arranged to stabilize a counterweight plate of a pendulum according to an embodiment.

FIG. 4 illustrates a perspective view of a system 400 including a stabilizer 410 including wiring 408 and arranged to stabilize a counterweight plate 404 of a pendulum according to an embodiment. The stabilizer 410 is mounted to a pedestal 423 of base 422. The stabilizer 410 includes weight 412, collar 420, and pin 430. The pin 430 includes a reduced portion 432. A pin detonator 434 is mounted to the reduced portion 432 of the pin 430. The wiring 408 is illustrated in FIG. 4, coupled to the pin detonator 434 to enable a firing system to controllably detonate the pin detonator 434 and sever the pin 430.

The illustrated pin detonator 434 can be a Teledyne RISI RP-81 exploding bridgewire (EBW) detonator or similar. The detonators can be wired together, e.g., in a series connection or parallel connection, and fired by the Teledyne RISI FS-43 firing system (see, e.g., the interconnected detonators illustrated in FIG. 5). Multiple detonators are permitted by Teledyne RISI to be wired in series. Up to four identical detonators can be operated in series using the FS-43 firing system, using up to 300 feet of C-cable. In an embodiment, a boosted RP-2 EBW detonator is used as the test charge detonator when the test charge is comprised of sheet explosive, whereas the secondary or pin detonator 434 is an RP-81.

The base 422 may include a tripod from Slik, Manfrotto, and the like, for increased stability. Tripods can include a threaded mounting stud (e.g., stud 224 of FIG. 2) made of metal such as brass. The illustrated embodiment replaces the ⅜-16 brass mounting stud of the tripod with a steel stud of the same dimensions. In an embodiment, the steel stud is a longer length than the standard brass stud used for cameras. The tripod is configured by extending its adjustable column 226 (FIG. 2) upward by approximately one inch, with a preference for no more than approximately one inch of extension in order to maintain overall high stability and rigidity of the stabilizer system. The placement location of the base 422 on the ground can be set before the first test of the day. The base 422 is configured with the weight 412. In an embodiment, the base 422 is firmly tethered to massive parts of a support structure supporting the ballistic pendulum, to enable the base to remain in position throughout multiple tests. In another embodiment, the base 422 is fixedly attached to the ground, e.g., via nails, adhesive pads, or other fasteners.

The pin 430 illustrated in FIG. 4 may be a dowel of various types of material, suitable to achieve a secure and stable pendulum location or equilibrium. The type of material is also chosen to ensure the pin 430 is severed or destroyed by the pin detonator 434. The pin 430 may be formed from various types of plastics, woods, or other types of material. Wood types include birch, oak, maple, or other woods commonly available in dowel form. The wood hardness or resistance to being severed is compensated for, by varying the diameter of the pin 430, e.g., via the reduced portion 432. Such compensation ensures that the pin detonator 434 is sufficient to sever the pin 430 in view of different types of materials and strengths of the pin detonator 434. For some materials of the pin 430, the cutout or reduced portion 432 is not needed in the pin 430, due to the strength of the material for a given thickness, and how the material reacts to the pin detonator 434. A length of the pin 430 can be chosen to allow for spacing above and below the pin detonator 434. Spacing between the pin detonator 434 and the counterweight plate 404 of the pendulum bob ensures that the firing of the pin detonator 434 does not influence the pendulum bob, as confirmed by testing. As illustrated in FIG. 2, the pin length corresponds to a total distance of two inches between the pendulum and the weight, minus a half inch distance of the pin detonator above the weight, corresponding to approximately 1-½ inches of distance between the pin detonator and the counterweight plate 404 of the pendulum.

The weight 412, which can be provided as a steel plate, is attached to the base 422 via the threaded steel stud (e.g., stud 224 of FIG. 2). Accordingly, the weight 412 is removable by unscrewing it from the base 422. The base 422 can therefore be easily cleaned and readied for the next test. After a test, the steel plate weight 412 can be unscrewed from the stud of the base 422, and any remaining portions of the pin 430 (e.g., wood fragments) are cleaned from the well or through-hole (e.g., receiving hole 218 of FIG. 2) formed in the weight 412. The weight 412 is reattached to the base 422, and a new pin 430 is installed, and the protective collar 420 is placed over the pin 430 onto the top of the weight 412.

The weight 412 can be formed as a plate made of steel or other material, and may be formed as a square, rectangle, circle (as illustrated in FIG. 4), or other shape. A steel plate weight 412 of the illustrated dimensions provides stability due to the heavy weight, and provides protection and shielding for the underlying base 422 including the tripod.

FIG. 5 illustrates a cross-section view of a system 500 including a stabilizer 510 and base 522 supporting and stabilizing a pendulum 502 in an equilibrium position according to an embodiment. The stabilizer 510 is supported by the base 522, and includes a weight 512 mounted to the base 522. The weight 512 supports the collar 520 and pin 530. The pin 530 engages the counterweight plate 504 of the pendulum 502.

The pendulum 502 is suspended to allow for displacement, when the stabilizer 510 is disengaged and the test charge 506 is detonated. The pendulum 502 includes a target plate 505 and a counterweight plate 504. The test charge 506 is positioned at a standoff distance from the target plate 505 of the pendulum 502. Accordingly, unplanned displacement of the pendulum 502 changes the standoff distance between the test charge 506 and the target plate 505. The system 500 prevents unplanned displacement by stabilizing the pendulum and maintaining a reliable, planned standoff distance between the test charge 506 and the target plate 505 of the pendulum 502. The test charge 506 includes a test detonator 507 for firing the test charge 506. The test detonator 507 is wired to the firing system 509 and the pin detonator of the system 500 via wiring 508. The stabilizer 510 is at a rear of the pendulum 502, at an end of the pendulum 502 opposite the test charge 506.

The firing system 509 causes the test detonator 507 and the pin detonator of the pin 530 to detonate. The pin 530 is severed, freeing the counterweight plate 504 of the pendulum. When freed, the pendulum is displaced by the action of the test charge 506. The stabilizer system 500 enables the test charge 506 to influence the pendulum without any stray influences (e.g., wind) that might otherwise contribute to unwanted displacement of the pendulum. The pin 530 does not restrain the pendulum 502 or otherwise prevent the pendulum 502 from being acted upon by the test charge 506. Accordingly, the system 500 improves test accuracy.

Figure 6:
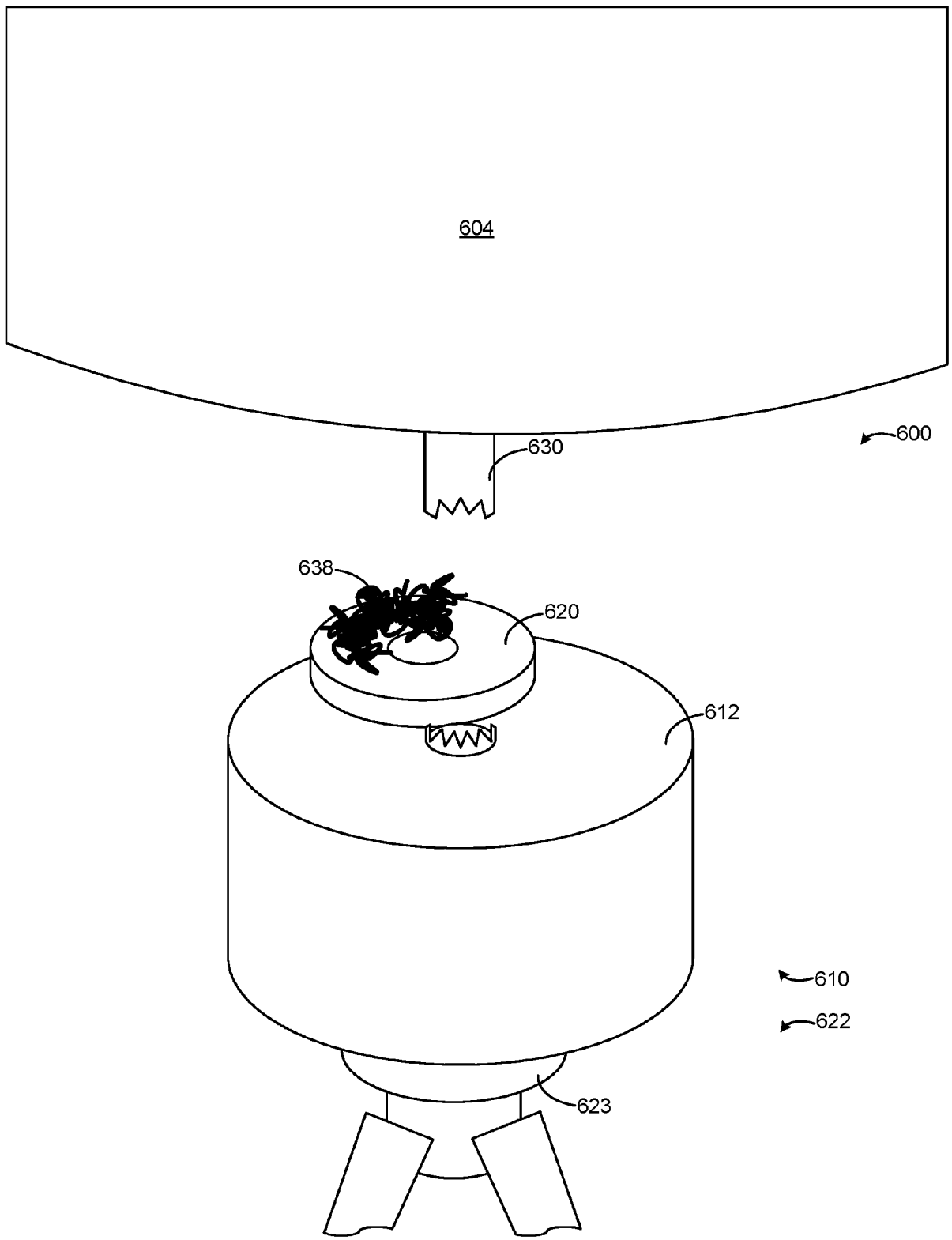
FIG. 6 illustrates a perspective view of a system including a stabilizer with a severed pin post-test according to an embodiment.

FIG. 6 illustrates a perspective view of a system 600 including a stabilizer 610 with a severed pin 630 post-test according to an embodiment. The protective ring-shaped collar 620 has been displaced off-center. A portion of the pin 630 is visible in the metal plate of the weight 612. The collar 620 includes debris 638 and damage resulting from firing of the pin detonator. The system 600 allows for easy clean up and resetting for the next test. The remnants of the pin 630 are removed from the weight 612 and the counterweight plate 604 of the pendulum. A lower section of a new pin 630 is inserted into the weight 612. The debris 638 is cleaned from the collar 620, and the collar is rotated to expose an undamaged section to the area where the pin detonator will be located. A new pin detonator is fitted to the reduced portion of the new pin, and the upper section of the new pin is inserted into the counterweight plate 604 of the pendulum. The system is then ready for the next test firing of the test charge.

Figure 7:
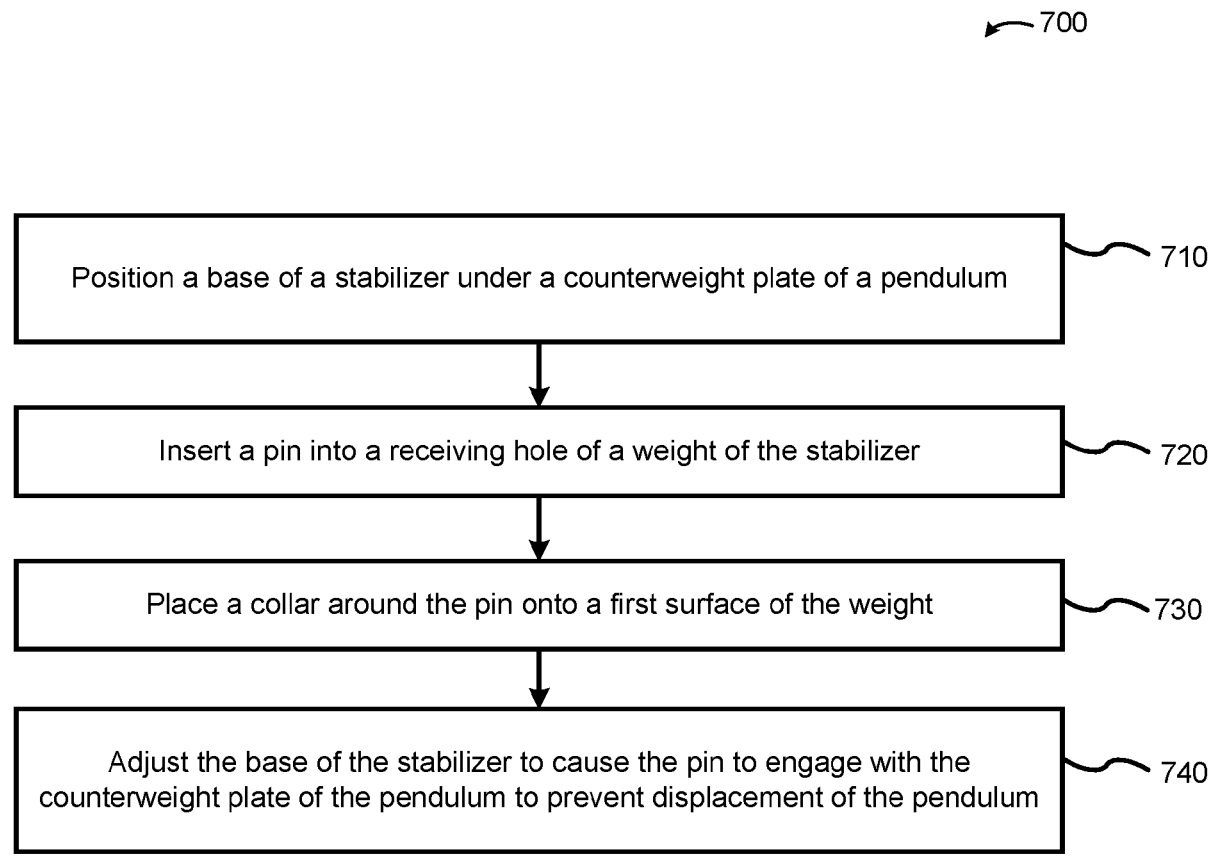
FIG. 7 illustrates a method of stabilizing a pendulum according to an embodiment.

FIG. 7 illustrates a method 700 to stabilize a pendulum according to an embodiment. At positioning 710, an operator positions a base of a stabilizer under a counterweight plate of a pendulum. For example, the base is a tripod supporting the stabilizer, and the pendulum is a ballistic pendulum that is used to carry out explosives testing of test charges. The pendulum includes a test plate and a counterweight plate. At insertion 720, the operator inserts a pin into a receiving hole of a weight of the stabilizer. For example, the pin is a wooden dowel including a reduced portion to receive a pin detonator to controllably sever the pin when the explosive testing is carried out. At collar placement 730, the operator places a collar around the pin onto a first surface of the weight. For example, the collar is metal to protect the first surface of the weight, and the collar is removable for easy replacement and can be repositioned or rotated to ensure that an undamaged portion of the collar is beneath the pin detonator. At adjustment 740, the operator adjusts the base of the stabilizer to cause the pin to engage with the counterweight plate of the pendulum to prevent displacement of the pendulum. For example, the operator activates an adjustable column of the tripod base of the stabilizer, thereby raising the stabilizer to allow the pin to engage in a receiving hole formed in an underside of the counterweight plate of the pendulum. Once engaged, the pin stabilizes the pendulum to prevent displacement of the pendulum from its equilibrium position (until the pin detonator is detonated, severing the pin and freeing the pendulum for displacement).

While a number of example embodiments of the present subject matter have been described, it should be appreciated that the present subject matter provides many applicable inventive concepts that can be embodied in a wide variety of ways. The example embodiments discussed herein are merely illustrative of ways to make and use the subject matter and are not intended to limit the scope of the claimed subject matter. Rather, as will be appreciated by one of skill in the art, the teachings and disclosures herein can be combined or rearranged with other portions of this disclosure and the knowledge of one of ordinary skill in the art.

Terms and phrases used in this document, unless otherwise expressly stated, should be construed as open ended as opposed to closed—e.g., the term "including" should be read as meaning "including, without limitation" or the like; the term "example" is used to provide example instances of the item in discussion, not an exhaustive or limiting list thereof; the terms "a" or should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Furthermore, the presence of broadening words and phrases such as "one or more," "at least," "but not limited to," or other similar phrases, should not be read to mean that the narrower case is intended or required in instances where such broadening phrases may be absent. Any headers used are for convenience and should not be taken as limiting or restricting. Additionally, where this document refers to technologies that would be apparent or known to one of ordinary skill in the art, such technologies encompass those apparent or known to the skilled artisan now or at any time in the future.

What is claimed is:

1. An apparatus comprising:
    a weight including a first side and a second side, the first side of the weight configured to form a receiving hole in the first side;
    a pin including a first end and a second end, the second end of the pin inserted into the receiving hole of the weight, the pin including a reduced portion; and
    a pin detonator coupled to the reduced portion of the pin to sever the pin when detonated.

2. The apparatus of claim 1, the second side of the weight configured to form a mount hole in the second side to mount the weight on a base.

3. The apparatus of claim 2, wherein the base is a tripod to support the weight.

4. The apparatus of claim 2, wherein the mount hole is threaded, and wherein the base includes a pedestal and a threaded stud to securely engage the mount hole.

5. The apparatus of claim 1, further comprising a collar disposed on the weight and disposed around the pin.

6. The apparatus of claim 1, wherein the pin includes a spacing distance from the first end of the pin to the reduced portion, to prevent the pin detonator from damaging a pendulum that is to be engaged by the first end of the pin.

7. The apparatus of claim 1, further comprising a firing system wired to the pin detonator.

8. The apparatus of claim 7, wherein the firing system is wired to a test detonator that is wired in series with the pin detonator.

9. A system comprising:
    a weight including a first side forming a receiving hole, and a second side forming a mount hole connected to the receiving hole via a through hole;
    a pin including a first end and a second end, the second end of the pin inserted into the receiving hole of the weight, the pin including a reduced portion;
    a pin detonator coupled to the reduced portion of the pin to sever the pin when detonated; and
    a base including a stud to engage the mount hole of the weight to mount the weight on the base.

10. The system of claim 9, wherein the base is a tripod including an adjustable column coupled to a pedestal supporting the stud.

11. The system of claim 9, wherein the pin is a frangible material.

12. The system of claim 9, wherein the pin is wood.

13. The system of claim 9, wherein the base is metal.

14. An apparatus comprising:
    a weight including a first side and a second side, the first side of the weight configured to form a receiving hole in the first side and the second side of the weight configured to form a mount hole interconnected to the receiving hole via a through hole; and a mechanism mounted to the receiving hole and supporting a retractable pin, the mechanism configured to controllably retract and extend the retractable pin.

15. The apparatus of claim 14, wherein the mechanism includes an electronically actuated solenoid to controllably retract and extend the retractable pin.

16. The apparatus of claim 15, wherein the electronically actuated solenoid is a spring-loaded linear solenoid.

17. The apparatus of claim 15, wherein the electronically actuated solenoid is a push-pull linear solenoid.

18. A method to stabilize a pendulum, comprising:
  positioning a base of a stabilizer under a counterweight plate of the pendulum;
  inserting a pin into a receiving hole of a weight of the stabilizer;
  placing a collar around the pin onto a first surface of the weight; and
  adjusting the base of the stabilizer to cause the pin to engage with the counterweight plate of the pendulum to prevent displacement of the pendulum.

19. The method of claim 18, further comprising disposing a pin detonator on a reduced portion of the pin.

20. The method of claim 19, further comprising firing the pin detonator to sever the pin to free the pendulum.

\* \* \* \* \*